United States Patent
Petzold et al.

(10) Patent No.: US 8,641,579 B2
(45) Date of Patent: Feb. 4, 2014

(54) METHOD FOR CONTROLLING A ROLLING OR COASTING FUNCTION OF A VEHICLE

(75) Inventors: Rainer Petzold, Friedrichshafen (DE); Peter Herter, Ravensburg (DE); Mario Steinborn, Friedrichshafen (DE); Franz Bitzer, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 82 days.

(21) Appl. No.: 13/502,231

(22) PCT Filed: Oct. 13, 2010

(86) PCT No.: PCT/EP2010/065307
§ 371 (c)(1),
(2), (4) Date: Apr. 16, 2012

(87) PCT Pub. No.: WO2011/061012
PCT Pub. Date: May 26, 2011

(65) Prior Publication Data
US 2012/0220421 A1   Aug. 30, 2012

(30) Foreign Application Priority Data
Nov. 19, 2009   (DE) .......................... 10 2009 046 863

(51) Int. Cl.
*B60W 10/02* (2006.01)
*B60W 10/04* (2006.01)

(52) U.S. Cl.
USPC ............ 477/174; 477/175; 477/176; 477/180

(58) Field of Classification Search
USPC .......................................... 477/174–176, 180
See application file for complete search history.

(56) References Cited

U.S. PATENT DOCUMENTS

| | | | |
|---|---|---|---|
| 5,281,190 A * | 1/1994 | Koivunen | 475/116 |
| 7,367,924 B2 | 5/2008 | Berger et al. | |
| 8,020,681 B2 * | 9/2011 | Davis | 192/45.1 |
| 8,464,852 B2 * | 6/2013 | Simon et al. | 192/35 |

FOREIGN PATENT DOCUMENTS

| | | |
|---|---|---|
| DE | 35 13 279 A1 | 10/1985 |
| DE | 198 45 604 C1 | 1/2000 |
| DE | 199 24 501 A1 | 12/2000 |
| DE | 10 2007 032 994 A1 | 2/2008 |
| WO | 2004/033246 A2 | 4/2004 |
| WO | 2005/058629 A1 | 6/2005 |
| WO | 2006/110945 A1 | 10/2006 |

* cited by examiner

*Primary Examiner* — Tisha Lewis
(74) *Attorney, Agent, or Firm* — Davis & Bujold, PLLC; Michael J. Bujold

(57) ABSTRACT

A method is proposed for controlling a through-connection clutch of a vehicle, in which an interlocking portion of the clutch is opened when the drive-train is virtually free from torque, a shifting operation is then carried out, and after the shifting operation the clutch is closed again. According to the invention, the torque transmitted by the interlocked connection in the clutch is influenced by controlling the motor in order to produce a torque-free condition at the interlocked connection in the clutch, in such manner that the interlocked connection is pre-stressed before the torque-free condition has been reached and separated immediately only when the torque-free condition is reached.

8 Claims, No Drawings

METHOD FOR CONTROLLING A ROLLING OR COASTING FUNCTION OF A VEHICLE

This application is a National Stage completion of PCT/EP2010/065307 filed Oct. 13, 2010, which claims priority from German patent application serial no. 10 2009 046 863.3 filed Nov. 19, 2009.

FIELD OF THE INVENTION

The present invention concerns a method for actuating a through-connection clutch.

BACKGROUND OF THE INVENTION

From automotive technology, functions and methods are known for opening and closing a friction clutch during driving, in order to carry out shifting operations. One of the essential quality objectives of these clutch operations is to carry out transmission gearshifts with the least possible residual torque in the drive-train. Namely, opening of the clutch when there is residual torque leads to a subjectively worse perception and to oscillations in the drive-train, which have a negative influence on a subsequent shift. In principle it is sought to gain separation of the drive-train in a condition of zero torque transmission. One way of doing this is to influence the motor torque, and another is by appropriate control of the clutch. In this, the aim is to keep any torque impulse in the drive-train as small as possible by virtue of a well-judged overlap of the two processes.

This overlapping control of the motor torque and the opening of the friction clutch is relatively difficult to master, because the process depends essentially on two influencing factors which can be determined only imprecisely by evaluating the sensor signals in the vehicle, on the one hand the current frictional properties of the friction clutch, which are dependent inter alia on the temperature, and on the other hand the residual torque still present in the drive-train. A further problem is that the displacement control of the friction clutch is relatively sluggish.

Above all, on uphill gradients the time window until a thrust torque is produced following a traction torque in the drive-train, is relatively short. Consequently, very severe demands are made on the control of a friction clutch and on the friction clutch itself.

In the present application a through-connection clutch is understood to be a clutch which is designed as a friction clutch during a slipping phase, whereas in phases when slipping of the clutch is not desired, the motor torque is transmitted by an interlocked connection between the motor and the transmission. Such a clutch, for example, is disclosed by WO 2006/110945 A1.

Through-connection clutches have a great advantage in that the frictional portion of the clutch only has to be designed for the torque needed for starting processes, but not for the maximum motor torque plus the usual safety factors, since the torque transmission during normal driving operation takes place by positive interlock.

During driving, for the purpose of carrying out shifting operations such clutches, like conventional clutches, can be opened and closed by virtue of the frictional portion of the clutch. The interlock connection is not engaged until the synchronization process between the rotational speeds of the motor and the transmission input shaft after a shift by means of the frictional part of the clutch has been completed.

SUMMARY OF THE INVENTION

The purpose of the present invention is to propose a method of the type described at the start by means of which comfort-optimized shifting processes can be carried out with the simplest possible control means, so far as possible without using the frictional connection of the clutch which is so difficult to master from the standpoint of regulation technology.

DETAILED DESCRIPTION OF THE PREFERRED EMBODIMENTS

Accordingly, a method is proposed for controlling a through-connection clutch of a vehicle, in which a positively interlocking part of the clutch is opened when the drive-train is virtually free from torque, the shifting operation is then carried out, and after the shifting operation the clutch is closed again. According to the invention, for this it is provided that the torque transmitted by the interlocked connection of the clutch is influenced by controlling the motor so as to produce a freedom from torque at the interlocking connection in the clutch, in such manner that before the torque-free situation has been reached the interlocked connection is pre-stressed and as soon as the torque-free condition is reached, the interlocked connection is immediately separated.

Thus, the separation of the through-connection clutch or drive-train takes place via the interlocked connection at a very low residual torque in the drive-train. For this the torque reduction is effected by influencing the motor, whereas the interlocked connection of the clutch is pre-stressed by a disengagement force. The size of this disengagement force is chosen such that only when freedom from torque is reached can the friction in the interlocked connection be overcome, whereby the clutch is then immediately separated.

With the method according to the invention a shifting operation can be carried out without, or almost without loading a frictional coupling device or friction clutch, so as to thereby avoid thermal stressing of the clutch and simplify the control. By virtue of the exclusive use of the interlocked connection for torque transmission, the highest possible torque can be transmitted by way of the through-connection clutch, whereby the dimensions of the clutch can be made smaller thanks to the use of the interlocked connection. Thus, in the method according to the invention the opening and closing are carried out directly, i.e. only by way of the interlocked mechanical connection of the clutch.

The closing of the interlocking connection in the through-connection clutch requires only equality of the rotational speeds between the components to be connected, and that the components should be positioned correctly relative to one another, which for example can be reliably detected and adjusted appropriately by virtue of sensors provided in the vehicle. For the opening or separation of the interlocked connection, i.e. for opening the clutch, there must be an absence of torque between the connected components.

Now, to do this particularly rapidly and simply, in the proposed method suitable measures are provided while the connection between the components is still in place. As such a measure, for example, the separation mechanism can be pre-stressed, for example by a force of such size that while there is still a torque between the components, a connection still exists. When, from this torque, by virtue of the zero transmission there is no longer a holding force between the components, separation of the components can take place automatically. Advantageously therefore, the interlocked connection is opened without using the frictional portion of the through-connection clutch.

In the context of the proposed method, the interlocked connection can be separated by increasing or reducing the torque transmitted by the interlocked connection in the clutch, depending on the driving situation, so that the required zero transmission point in the torque variation is passed through while the interlocked connection is in place. By influencing the motor torque or the torque transmitted by the clutch in this manner, the torque-free situation required for separating the interlocked connection in accordance with the invention can be passed through.

By separating the drive-train only by controlling the mechanical portion or interlocked connection of the through-connection clutch in accordance with the invention, the drive-train can be separated in a much shorter time than can be realized with a conventional clutch or with the frictional portion of the clutch. Accordingly, even a rapid transit through the torque-free point is sufficient for the method according to the invention.

In a related further development of the invention, it can be provided that the components connected by the interlocked connection are pre-stressed for example by a pneumatic, hydraulic or electric force and also, when the zero-transmission point in the torque variation has been reached, separated from one another pneumatically, hydraulically or electrically. For example, this can be done by acting upon a shifting cylinder of the separating mechanism. By this action before the zero-torque point, the shifting cylinder is already pre-stressed and when the friction at the interlocked connection formed for example as a claw connection decreases to a value smaller than a level that can be determined by design, the connection or clutch is separated in a very rapid and qualitatively good manner by acting fully upon the shifting cylinder.

After the shifting operation has taken place, to be able to close the interlocking connection so far as possible without loading the frictional portion of the clutch, the rotational speeds of the components to be connected with interlock are equalized and with the components correctly orientated, the clutch is closed again to complete the shifting operation.

The invention claimed is:

1. A method of controlling a through-connection clutch of a vehicle, the through-connection clutch being designed as a friction clutch during a slipping phase and, in phases when slipping of the through-connection clutch is undesired, motor torque being transmitted, between a motor and a transmission, by an interlocked connection, the method comprising the steps of:
   in the method for controlling the through-connection clutch, an interlocking portion of the through-connection clutch is opened when a drive-train of the vehicle is virtually free from torque,
   then carrying out a shifting operation, and after the shifting operation, the through-connection clutch is again engaged,
   wherein a torque transmitted by the interlocked connection in the through-connection clutch is influenced by controlling the motor such that at the interlocked connection in the through-connection clutch, freedom from torque is reached and, before a point of freedom from torque is reached, pre-stressing the interlocked connection in the through-connection clutch by a disengagement force and immediately opening when a point of freedom from torque is reached.

2. The method according to claim 1, further comprising the step of either increasing or reducing the torque transmitted by the interlocked connection in the clutch depending on a driving situation, such that torque variation passes through a zero-transmission point while the interlocked connection is still in place.

3. The method according to claim 1, further comprising the step of pre-stressing components connected by the interlocked connection at least one of pneumatically, hydraulically and electrically, and separating the components from one another when the zero-transmission point is reached in the torque variation.

4. The method according to claim 1, further comprising the steps of equalizing rotational speeds of the components to be connected by the interlocked connection after a shifting operation for engaging the interlocked connection in the clutch, and engaging the interlocking connection when the components are correctly orientated.

5. A method of controlling a through-connection clutch of a vehicle which is located between an engine and a transmission in a drive train of the vehicle, the through-connection clutch comprising frictional elements which frictionally transmit torque through the through-connection clutch during a slipping operation of the through-connection clutch, and an interlock connection which transmits the torque through the through-connection clutch when slippage is undesired, the method comprising the steps of:
   initiating a shifting operation for carrying out a transmission gearshift;
   pre-stressing the interlock connection in the through-connection clutch with a disengagement force;
   controlling the engine to reduce the torque transmitted by the interlock connection through the through-connection clutch;
   immediately opening the interlock connection of the through-connection clutch when no torque is transmitted by the interlock connection through the through-connection clutch;
   carrying out the shifting operation when the interlock connection of the through-connection clutch is disengaged; and
   reengaging the interlock connection of the through-connection clutch following the shifting operation.

6. The method according to claim 5, further comprising the step of one of increasing or reducing the torque transmitted by the interlock connection in the clutch by controlling the engine such that no torque is transmitted by the interlock connection through the through-connection clutch while the interlocked connection is still engaged.

7. The method according to claim 5, further comprising the step of pre-stressing components that are connected by the interlock connection either pneumatically, hydraulically or electrically, and separating the components from one another when no torque is transmitted by the interlock connection through the through-connection clutch.

8. The method according to claim 7, further comprising the step of equalizing rotational speeds of the components, after carrying out the shifting operation, and engaging the interlock connection of through-connection clutch once the rotational speeds of the components are equal.

* * * * *